United States Patent Office 3,348,988
Patented Oct. 24, 1967

3,348,988
METHOD OF INSTALLING TILE WITH AN EPOXY RESIN COMPOSITION
Herman B. Wagner, Blooming Glen, Pa., and Ernest E. Weller, Sayreville, N.J., assignors to Tile Council of America, Inc., New York, N.Y., a corporation of New York
No Drawing. Filed June 29, 1962, Ser. No. 206,162
2 Claims. (Cl. 156—71)

The present invention relates to adhesive compositions and more particularly to unitary compositions comprising epoxy resins and an amine hardener which may be rendered functional simply by the addition of a liquid thereto.

The usefulnes of epoxy resin adhesives is universally recognized, and the applications therefor are literally too numerous to mention. Despite their wide acceptance, conventional handling of such materials presents numerous problems. Because of their extraordinary qualities, however, epoxy resin adhesives have been generally accepted commercially in spite of the fact that they are frequently awkward to use.

Epoxy resin polymers are generally formed by bringing together an epoxide resin monomer or prepolymer and a liquid amine hardener. The two basic components are mixed intimately and the cross-linking and polymerization that takes place result in a product having extremely high bond strength and chemical resistance. The amine hardener is usually a diamine or a polyfunctional amine, i.e., a compound with two or more amino nitrogen groups. Such amine compounds are well understood in the art (see Lee and Neville, Epoxy Resins, McGraw-Hill, 1957) and have been recognized to be especially well suited for cross-linking with epoxy polymers because of their very high reactivity even at room temperature.

Because of the great reactivity of the amine hardeners with the epoxy resin, it has heretofore generally been necessary to prevent contact of the hardener and the epoxy resin until immediately before the hardening reaction is to be effected. This has required packaging of the hardener and the epoxy resin in separate containers, and the metering of proper weight or volume proportions of each at the time of use. The former requirement has been undesirable from the standpoint of efficient packaging and storage of these materials, and the latter requirement undesirable from the standpoint of convenience in use and reliablity in unskilled hands.

The present invention avoids the disadvantages of the two-part epoxy resin systems and provides a unitary adhesive composition which may be made functional and ready for use by the addition of a liquid vehicle which serves the dual function of activating the polymerization reaction and giving fluidity to the dry pulverulent composition. When activated by addition of a liquid, curing occurs at room temperature, and there is no need to heat the composition to effect a cure.

According to the present invention the amine hardener is adsorbed on a molecular sieve powder and in this form admixed with the epoxy resin to yield a remarkably storage stable one-part system. At the time of use, the resulting composition is activated simply by addition of a readily available non-polar liquid, such as water, ethyl alcohol, methyl alcohol, methyl ethyl ketone, methyl isobutyl ketone, butyl acetate, and the like. Preferably, the activating liquid will be water. Enough of the liquid is added to provide the degree of fluidity desired for the application and the amount is limited only to this extent.

The present invention comprises bringing together in dry pulverulent form the following substances:

An epoxy resin, a di- or poly-functional amine adsorbed on a molecular sieve powder, and, at the time of use, a polar liquid, such as water, alcohol, and so forth, to initiate the polymerization.

The polyfunctional amines or polyamines suitable for use are aliphatic polyamines containing two or more amino nitrogens preferably attached to aliphatic carbon atoms, and more particularly amines of the formulae:

$$R_{n-1}(NR'_2)_n, \quad R_n(NR'_2)_n$$

where R is an aliphatic hydrocarbon radical and R' is an aliphatic or aromatic hydrocarbon group or hydrogen. Preferably the polyamines contain 2 or more primary or secondary amino nitrogens, have not more than about 30 carbon atoms in the aliphatic group connected to the amino nitrogens, and not more than a total of about 50 carbon atoms. Especially suitable are polyamines containing 2 or more primary amino nitrogens connected to an aliphatic hydrocarbon group containing up to 30 carbon atoms.

Examples of polyamines that may be used include ethylene diamine, propylene diamine, diethylene triamine, dipropylene triamine, triethylene tetramine, tripropylene tetramine, tetraethylene pentamine, tetrapropylene pentamine, and mixtures of the foregoing. Also may be mentioned higher alkyl polyamines satisfying the above formulae, such as alkyl polyamines in which the alkyl group is butyl, hexyl, octyl and so forth.

Due to their greater availability, commercially produced polyfunctional amines may also be used as hardeners. Examples of such commercially available amines are those obtained from the Chemical Division of Armour & Company under the trade names "Duomeen O" and "Duomeen S." "Duomeen O" consists essentially of a mixture of n-alkyl trimethylene diamines derived from technical grade oleic acid. The alkyl group content is distributed as follows:

| | Percent |
|---|---|
| C-14 | 2 |
| C-16 | 5 |
| C-18 | 93 |

"Duomeen S" consists essentially of a mixture of N-alkyl trimethylene diamines derived from soya acids. The alkyl group content is distributed approximately as follows:

| | Percent |
|---|---|
| C-16 | 13 |
| C-18 | 87 |

Preferred curing or cross-linking agents for the epoxy resin compositions used in the present invention may be described as poly-amido-amine epoxide hardeners. Epoxy resins cured with such hardeners, it has been discovered, have the unique and unexpected property of being water soluble. As a result, such cured epoxy resins can readily be cleaned from surfaces simply by wiping or scrubbing with water. Additionally, and very importantly, epoxy resins cured with such hardeners have unique physical properties and are therefore suitable for use in the construction materials of the present invention.

The poly-amido-amine epoxide hardeners are produced by copolymerization of polyamines with polycarboxylic acids, the copolymerization reaction being permitted to proceed to such an extent that the products produced are soluble in both epoxy resin and water.

In conducting the copolymerization reaction, it is important that excess polyamine be used, so that unreacted polyamine is present in the resulting copolymer. In the case where no unreacted amine remains, water solubility is lost and the products do not possess the required ability to harden an epoxide polymer. Nor are such reaction products soluble in the epoxy resin and water.

Suitable amine hardeners are prepared by reacting the polyamines and polycarboxylic acids described herein at temperatures below the decomposition temperature of the polyamines by employing the appropriate polyamine in stoichiometric excess of that theoretically required to react with the appropriate polycarboxylic acid. The temperature of the reaction is preferably between about 100° and 200° C. Especially good results are achieved when the temperature is between about 120° and 160° C.

Aliphatic polyamines containing two or more amino nitrogens such as those described hereinabove may be used to produce such poly-amido-amine hardeners. Polyamines containing primary nitrogens are especially suitable.

The polycarboxylic acids suitable for reaction with the above described polyamines to produce poly-amido-amine epoxide hardeners have at least two carboxyl groups and may be represented by the formula $R(COOH)_n$, where R is a hydrocarbon radical which may be saturated or unsaturated, aliphatic, cyclicaliphatic, or heterocyclic, and $n$ is an integer having a value of at least 2. Among the preferred polycarboxylic acids are the straight chained saturated dicarboxylic acids such as adipic, pimelic, suberic, azeloic, sebacic, nonone dicarboxylic acid, and the higher members of this series, including mixtures thereof. Also may be mentioned straight chained unsaturated dicarboxylic acids, including citraconic acid, mesaconic acid and itaconic acid. Especially suitable for use are the so-called resin acids. These may be classified as diterpene acids, a major constituent being abietic acid. When such diterpene acids are dimerized, a dicarboxylic acid results. Particularly useful are those diterpene acids which, upon being dimerized, have a formula weight of about 300 to 900, and preferably between about 500 to 600.

The poly-amido-amine epoxide hardeners are produced by dissolving the polycarboxylic acid and polyamine in a suitable organic solvent, in which the polyamine and the polycarboxylic acid are soluble. The amount of the polyamine is in excess of that stoichiometrically required to react with the polycarboxylic acid. The amount of excess polyamine is preferably at least about 5 percent, and may be between about 5 and 200 percent, or higher, and preferably between about 50 and 150 percent, based on the polycarboxylic acid. The solvent employed is not critical, since after mixing the solvent is preferably removed, for example, by evaporation. The residue remaining after solvent evaporation is then heated to a temperature of between about 100° to 200° C., care being taken that the temperature employed is below the decomposition temperature of the polyamine used. The time of heating should be at least about one-half hour, or between about 1 and 16 hours. Although the solvent is preferably removed prior to heatitng, it should be understood that the solvent may also be removed after heating.

Poly-amido-amine epoxide hardeners suitable for use herein and their method of production are more clearly described in copending application Ser. No. 48,359, filed Aug. 9, 1960.

Molecular sieves are made by Linde Air Products Company and are described in U.S. Patent Nos. 2,882,243 and 2,882,244. They are alkali metal aluminosilicates which are made highly adsorbent by driving off their water of hydration. Such sieves will abosrb up to 22% or more of their weight of liquid. Three types may be used advantageously in the present invention:

Type 4A $0.96\pm0.04NaO.1.00Al_2O_3.1.92\pm0.09SiO_2.xH_2O$
Type 5A (same as 4A but 75% of Na ions have been replaced by Ca ions)
Type 13X $0.83\pm0.05Na_2O.1.00Al_2O_3.2.48\pm0.03SiO_2.xH_2O$ The type number gives the size of the pore opening in the sieve in angstroms. The sieve particles themselves may range in size from between about 1 and 5 microns.

The resinous epoxides suitable for use in the present invention comprise those compounds having at least two epoxy groups, i.e., at least two

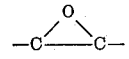

groups. The polyepoxides may be saturated or unsaturated, cycloaliphatic, heterocyclic, or preferably aliphatic, and may be substituted if desired with substituents such as chlorine atoms, hydroxyl groups, ether radicals, and the like. They may also be monomeric or polymeric.

Examples of the polyepoxides include, among others, epoxidized glycerol dioleate, 1,4-bis(2,3-epoxypropoxy) benzene, 1,3-bis(2,3-epoxypropoxy) benzene, 4,4'-bis(2,3-epoxypropoxy) diphenyl ether, 1,8, - bis(2,3 - epoxypropoxy)-octane, 1,4-bis(2,3-epoxypropoxy)-cyclohexane, 4, 4' - bis(2 - hydroxy-3,4'-epoxybutoxy)-diphenyldimethylmethane, 1,3-bis(4,5-epoxypentoxy)-5-chlorobenzene, 1,4-bis(3,4 - epoxybutoxy) - 2-chlorocyclohexane, 1,3-bis(2-hydroxy-3,4-epoxybutoxy) benzene, 1,4-bis and (2-hydroxy-4,5-epoxypentoxy benzene.

Among the preferred epoxides are the epoxy polyethers of polyhydric phenols obtained by reacting a polyhydric phenol with a halogen containing epoxide or dihalohydrin in an alkaline medium. Polyhydric phenols that can be used for this purpose include, among others, resorcinol, catechol, hydroquinone, methyl resorcinol, or polynuclear phenols, such as 2,2-bis(4-hydroxy-phenyl) propane (Bisphenol A), 2,2-bis(4-hydroxyphenyl) butane, 4,4'-dihydroxybenzophenone, bis(b-hydroxyphenyl) ethane, 2,2-bis(4-hydroxyphenyl) pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula:

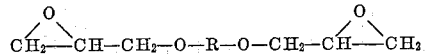

wherein R represents a divalent hydrocarbon radical of the dihydric phenol. The polymeric products will generally not be a single simple molecule but will be a complex mixture of glycidyl polyethers of the general formula:

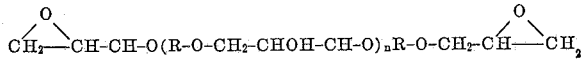

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxy resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins" (Shell Chemical Corporation), "Gen Epoxy (General Mills), "DER Resins" (Ciba), "ERL Resins" (Bakelite Corporation), "Epi-Rez" (John Dabney); and the trifunctional epoxy compounds sold under the trademark "Epiphen" (The Borden Company). An example of the trifunctional type of compounds is "Epiphen" ER–823, which has the following formula:

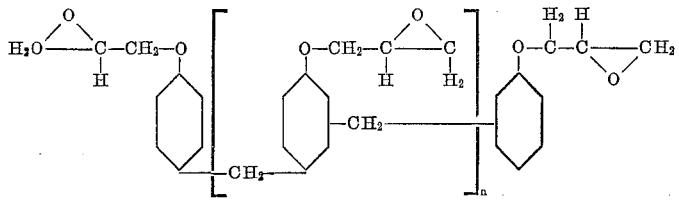

where $n$ is a number such that from about 180 to 200 grams of the resin contain about one gram mole of epoxide group.

The epoxide resins suitable for use in the present invention may contain between about 5 and 400 percent, and preferably between about 10 and 300 percent, by weight, based on the weight of epoxy resin, of an inert, finely divided solid.

Suitable finely divided inert solid materials for use with the epoxy resins include fillers, such as asbestos, albality, silica, mica, flint powder, quartz, cryolite, Portland cement, limestone, atomized alumina, barytes, talc, pyrophyllite, various clays, diatomaceous earth, and other like materials. Also may be mentioned pigments, such as titanium dioxide, cadmium red, carbon black, aluminum powder, and the like.

Suitable other colorants may be added to the epoxy resin if desired. Typical of these are: National Fast Red (National Aniline); Calco Condensation Green A.Y. (American Cyanamid); Calco Condensation Blue (American Cyanamid); Bismark Brown (National Aniline); Blue Lake (13% Ponsal Blue, 10% aluminum hydrate and 77% blanc fixe), Krebs BP–179–D, Blue Lake Krebs BP–258–D. Lithol Tower, Chrome Yellow, Iron Blue, Milari Blue, Monastral Green, Maroon Toner, Chrome Green, Chrome Orange, Iron Oxide Reds, Aluminum Powder, and flatting agents like diatomaceous silica and silica aerogel. The color materials should be selected, however, so as to be non-reactive with the epoxy resins and other ingredients at atmospheric temperature, as otherwise this might cause poor storage stability and also affect the retention of adhesiveness.

The finely divided inert solid materials suitable for use herein may have an average particle size ranging between about 50 mesh and 400 mesh, and preferably between about 100 and 400 mesh (U.S. Std. Series). The exact size of the inert finely divided solid materials will depend upon the particular application of the compositions.

In addition to finely divided solid materials, a wide variety of resinous modifiers may be added to the epoxy resin systems disclosed herein. Among these may be mentioned the phenolic resins, such as aniline formaldehyde resins; urea resins, such as urea formaldehyde resins; melamine resins, such as melamine formaldehyde resins; polyester resins, such as those produced from polybasic acids and polyhydroxyl alcohols and which may contain free carboxyl groups and/or aliphatic hydroxyls capable of reacting with the epoxy resins; vinyl resins such as vinyl chloride, vinylidene chloride and the like; and polystyrene. The resinous modifiers may vary from about 1 to about 100 percent or more, by weight, based on the weight of the epoxy resin.

When the epoxy resins are liquid, these are preferably absorbed or otherwise carried on inert materials or fillers to make an all powder composition. As an example of such inert materials may be mentioned zirconium silicate, silica aerogel, blanc fixe, talc, pyrophyllite, various clays, diatomaceous earth, and other like inert materials. The carriers for the epoxy resins are preferably in a fine state of subdivision, and have high surface areas. Good results are also achieved when aggregates or pigments, such as sand, titanium dioxide, and the like are used in combination with such fillers.

Zirconium silicate and titanium dioxide are particularly suitable as a combination carrier and pigment for the epoxy resin of the present invention. These materials in combination insure the availability of a great surface for contact of the epoxy resins and the amine hardener when it is released from the molecular sieve.

If desired, of course, a liquid epoxy resin may also be adsorbed on molecular sieve powder.

Liquid epoxide resins described herein through intermixture with and absorption on the inert materials and aggregates described may be made substantially dry and can be dry mixed with the molecular sieve powders containing the amine hardener. The mixtures are relatively uniform and therefore may be prepared in such manner that any portion may be removed from the whole and still retain substantially the proportion of epoxy resin and amine hardener which were originally determined to be most suitable for the particular ingredients used in making up the dry composition.

In forming the epoxy resin bonding compositions, enough of the hardener in the form described is added to the epoxy resin composition to insure that upon activation, good hardening is achieved. Preferably the hardener and epoxy resin prepolymer are present in the dry compositions in stoichiometric proportions. Depending on the nature of the adhesive composition desired, however, greater or lesser amounts of the hardener may, of course, be used.

When water or other polar solvents are added to the compositions to make them functional, i.e., to initiate and cause polymerization, it is believed that the water or other activating liquid displaces the amine hardener from the pores of the molecular sieve, thereby making the free amine available for reaction and hardening of the epoxide resin.

Epoxy resin compositions in the form described herein are particularly adapted for use as trowelable grouts or mortars to set ceramic tiles, and to fill the joints between the tiles. When used for this purpose, the epoxy resin compositions form a hard, adherent, chemically resistant bond. These compositions also have the advantage that they cure at room temperature, thereby rendering their use for this purpose especially advantageous.

The epoxy resin compositions comprising hardeners in the form described bond exceedingly well to ceramic tile edges and to the backs of ceramic tile. Additionally, these compositions are flexible, and resistant to moderate temperature change. Also, such compositions are resistant to acid and alkali attack.

Specific examples embodying the teachings set forth above are here given by way of exemplification and not restriction.

*Example 1*

A hardener was prepared by admixing 1.50 weight parts of diethylene triamine with 10.0 weight parts of molecular sieve 13X, supplied by the Linde Air Products Company. The molecular sieve had a particle size of 200 to 300 mesh (United States Std.). The resulting product, which was a free flowing powder, was then combined with 15.0 weight parts of a liquid epoxy resin of the epichlorohydrin-bisphenol of acetone type having a viscosity of about 13,000 centipoises at 20° C., and an epoxide equivalent weight of about 185 grams. The resin was supplied under the name Epon Resin 828 by Shell Chemical Corporation.

The resulting product was a stable paste. The addition of 7.0 parts of water caused hardening within 24 hours.

*Example 2*

Example 1 was repeated with the exception that 7.0 weight parts ethylene diamine were substituted for the 1.50 weight parts of diethylene triamine. Similar results were obtained.

*Example 3*

A hardener was prepared by admixing 2.4 weight parts of triethylene tetramine with 13 weight parts of the molecular sieve 13X powder of Example 1. The resulting powder was then combined with 15.0 weight parts of the epoxy resin of Example 1, and a stable paste thereby formed. The addition of 8.5 weight parts of water to the paste caused hardening to occur.

*Example 4*

A hardener was formed by admixing 2.8 weight parts of tetraethylene pentamine with 15 weight parts of the molecular sieve 13X powder described in Example 1. The resulting powder was combined with 15.0 weight parts of the epoxy resin described in Example 1 to yield a stable paste. The addition of 10 weight parts of water to the paste caused hardening to occur.

*Example 5*

Example 1 was repeated with the exception that Epiphen ER-845, supplied by the Borden Company and described hereinabove, was substituted for Epon 828. The Epiphen ER-845 used had a viscosity of about 4,000 to 5,000 centipoises at 20° C., and an epoxide equivalent weight of about 210 grams. Results similar to those of Example 1 were obtained.

*Example 6*

Example 2 was repeated using the Epiphen ER-845 resin of Example 5. Similar results were obtained.

*Example 7*

Example 3 was repeated using the Epiphen ER-845 resin of Example 5. Similar results were obtained.

*Example 8*

Example 4 was repeated using the Epiphen ER-845 resin of Example 5. Similar results were obtained.

*Example 9*

The diethylene triamine molecular sieve powder of Example 1 was combined with a solid epoxy resin as follows:

Weight parts
Diethylene triamine-molecular sieve powder _____ 11.5
Epon 1001 _____ 30.0

Epon 1001 was supplied by Shell Chemical Corporation. It was a solid epichlorohydrin-bis-phenol of acetone epoxy resin having a melting point of about 70° C., an epoxide equivalent of about 480 grams, and had a particle size of 50 to 100 mesh, (United States Std. Series).

The resulting unitary, all-powder composition was stable on storage. When 20 grams of ethyl alcohol were added thereto, a heavy paste which was readily spreadable was formed and the paste became hard on standing.

*Example 10*

Example 9 was repeated with the exception that methyl-ethyl ketone was used as the activating liquid. Similar results were obtained.

*Example 11*

Example 9 was repeated with the exception that methyl isobutyl ketone was used as the activating liquid. Similar results were obtained.

*Example 12*

Example 9 was repeated with the exception that butyl acetate was used as the activating liquid. Similar results were obtained.

*Example 13*

Dimerized tall oil resin and ethylene diamine in a molecular ratio of 1 to 2 are dissolved in ethyl alcohol and the alcohol then evaporated to give an intimate mixture of the two components. The resulting mixture is then heated at 155° C. for 1 hour to yield a poly-amido-amine tall oil resin.

Two hundred grams of Linde molecular sieve 13X are ground to pass a 100 mesh screen. To the 200 grams of these pulverized sieves are added 40 grams of a poly-amido-amine tall oil resin produced as indicated hereinabove. The two components are mixed to form a free flowing, dry powder.

Utilizing the above "dry" hardener powder the following stable epoxy mixture is prepared by blending:
60 grams of the Linde molecular sieves containing the poly-amido-amine tall oil resin
20 grams Epon 828 epoxy resin (Shell)

Upon stirring 10 grams of water into the resulting epoxy mixture, a readily spreadable paste is formed. The paste becomes hard upon standing overnight (about 16–18 hours).

*Example 14*

To 100 grams zirconium silicate (Superpox of Titanium Alloy Mfg. Co.) and 20 grams $TiO_2$ is added 16 grams Epon 828.

These components are manually mixed to form a free flowing powder to which is added 40 grams of the Linde molecular sieve powder prepared according to Example 13.

The resulting blend is an extremely acceptable and stable all-powder epoxy system which becomes workable and cures in reasonable time upon the addition of 30 grams of water.

In Examples 13 and 14, the Epon 828 resin is the same as the liquid epoxy resin described in Example 1.

*Example 15*

The adhesive composition of Example 13 is spread on a concrete substratum to provide a mortar bed about 1/8" thick. Ceramic tile, 1½" x 1½", premounted on the face of 1' x 2' sheets with about 1/8" spacing between the tile are laid on the mortar bed and beat to level. After 24 hours, the paper is removed from the face of the tile and the joints between the tile grouted with more of the composition of Example 13. Following grouting, excess adhesive on the surface of the tile is removed by wiping with a cloth wetted with water. A strong but flexible bond between the tile and substrate is obtained, and the installation has high wear resistance.

The invention in its broader aspects is not limited to the specific steps, methods, compositions and improvements shown and described herein, but departures may be made within the scope of the accompanying claims without departing from the principles of the invention and without sacrificing its chief advantages.

What is claimed:
1. In a method of installing tile on a substrate, the improvement which comprises preparing a mortar by adding a member selected from the group consisting of water, ethyl alcohol, methyl alcohol, methyl ethyl ketone, methyl isobutyl ketone, butyl acetate, and mixtures of the foregoing to a unitary composition consisting essentially of, in intimate admixture, an epoxy resin having at least two reactive epoxy groups

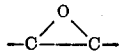

and a polyfunctional amine epoxy resin hardener absorbed on a molecular sieve powder, to form a trowellable admixture, utilizing the resulting admixture to install the tile, and allowing the admixtures to cure.

2. In a method of installing tile on a substratum, the improvement which comprises preparing an adhesive mortar composition by adding a member selected from the group consisting of water, ethyl alcohol, methyl alcohol, methyl ethyl ketone, methyl isobutyl ketone, butyl acetate and mixtures of the foregoing to a unitary composition consisting essentially of, in intimate admixture, an epoxy resin having at least two reactive epoxy groups

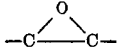

and an amine epoxy resin hardener adsorbed on a molecular sieve powder, said hardener being the reaction product of a polycarboxylic acid and a stoichiometric excess of a polyfunctional amine to form a trowellable mortar; covering the substratum with a bed of the resulting adhesive mortar composition; spacedly setting ceramic tile in the bed; and removing excess adhesive mortar composition from the tile surfaces by cleaning with water.

References Cited

UNITED STATES PATENTS

| | | | |
|---|---|---|---|
| 3,018,264 | 1/1962 | Colclough | 260—37 |
| 3,036,980 | 5/1962 | Dunham et al. | 260—37 XR |
| 3,050,493 | 8/1962 | Wagner | 260—29.2 |
| 3,212,946 | 10/1965 | Weller | 260—37 |
| 3,242,116 | 3/1966 | Becker | 260—29.2 |

OTHER REFERENCES

Lee et al., "Epoxy Resins," McGraw-Hill, 1957, pp. 15 and 152.

Linde Bulletin, "Chemically Loaded Molecular Sieves in Rubber and Plastics," 1960, 12 pages.

Linde Bulletin, "Faster Cures," Mar. 10, 1961, 4 pages.

JULIUS FROME, *Primary Examiner.*

MORRIS LIEBMAN, *Examiner.*

A. H. KOECKERT, *Assistant Examiner.*